June 28, 1955 J. P. HORAN 2,711,623
TRACTOR PROPELLED BRUSH CUTTER
Filed Feb. 12, 1951 3 Sheets-Sheet 1
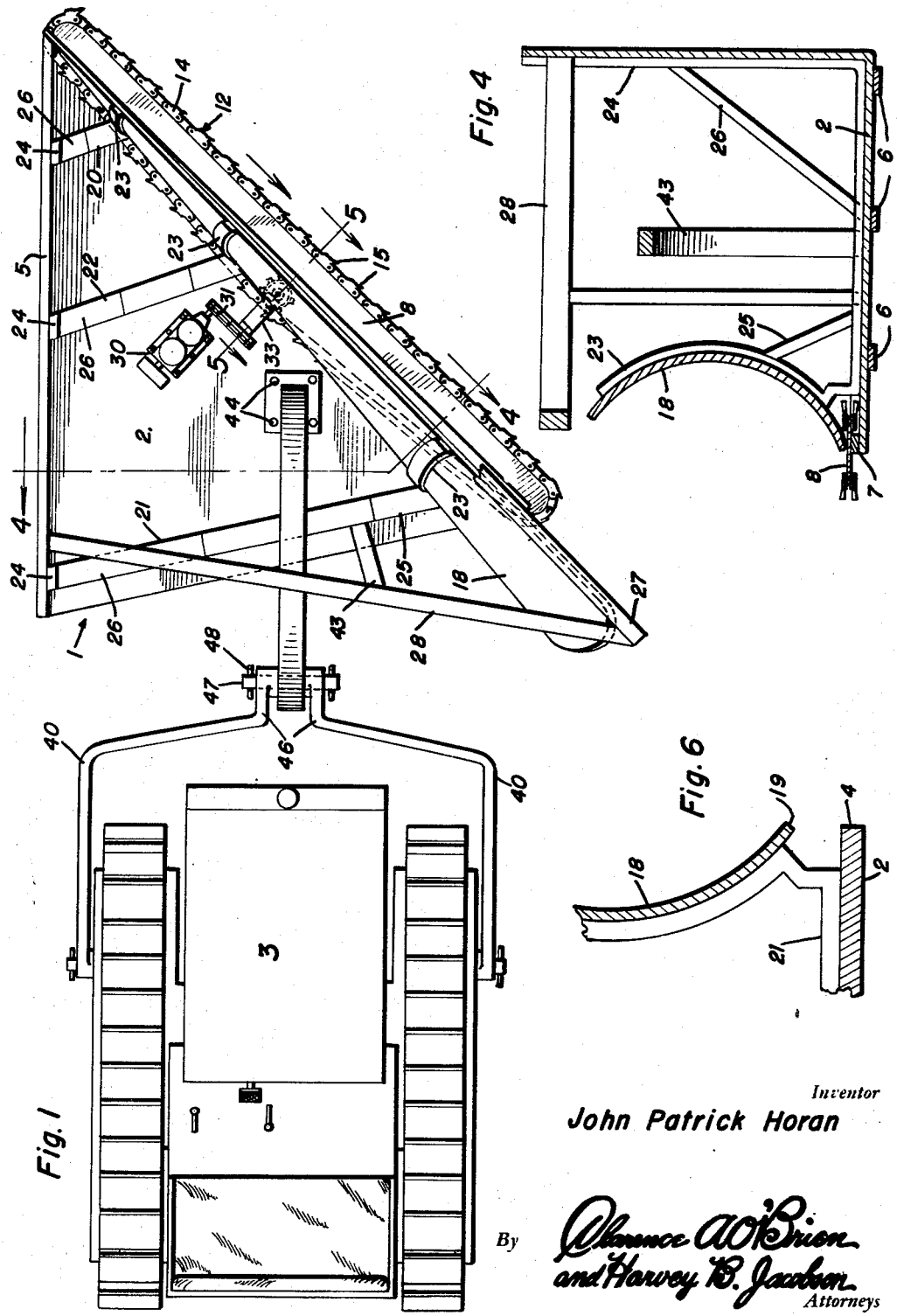
Inventor
John Patrick Horan June 28, 1955  J. P. HORAN  2,711,623
TRACTOR PROPELLED BRUSH CUTTER
Filed Feb. 12, 1951  3 Sheets-Sheet 2
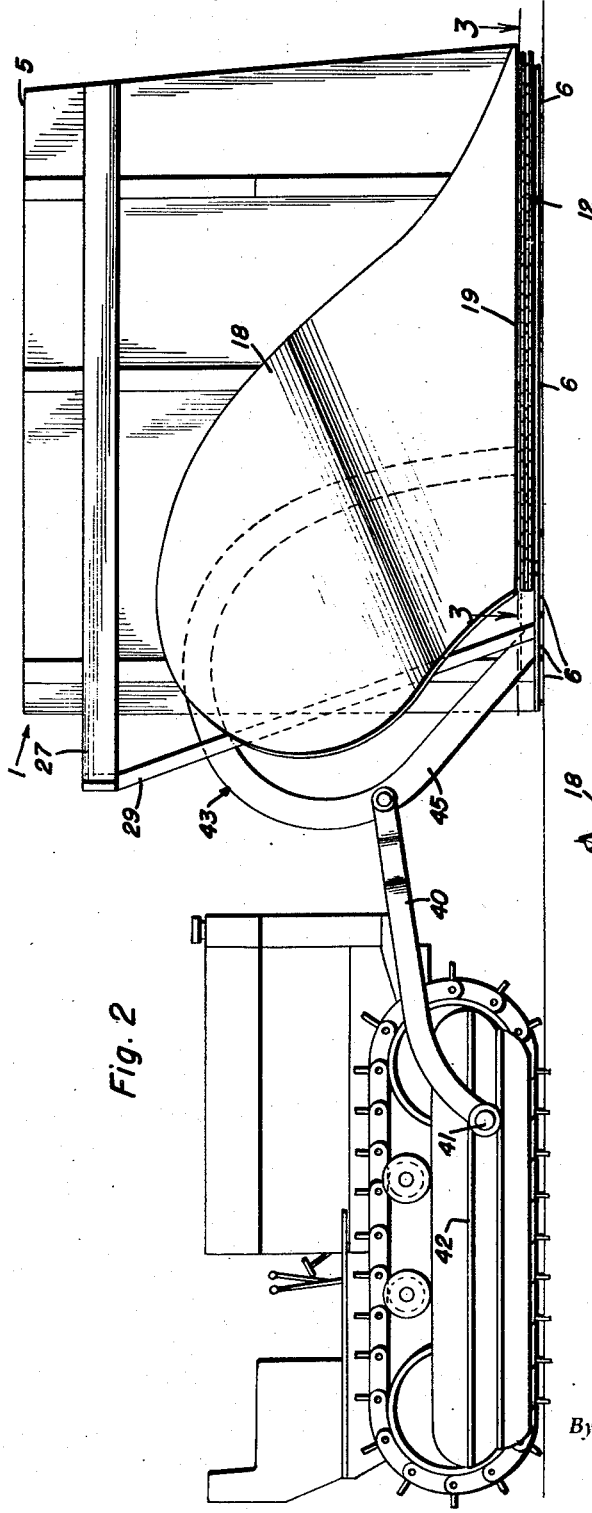
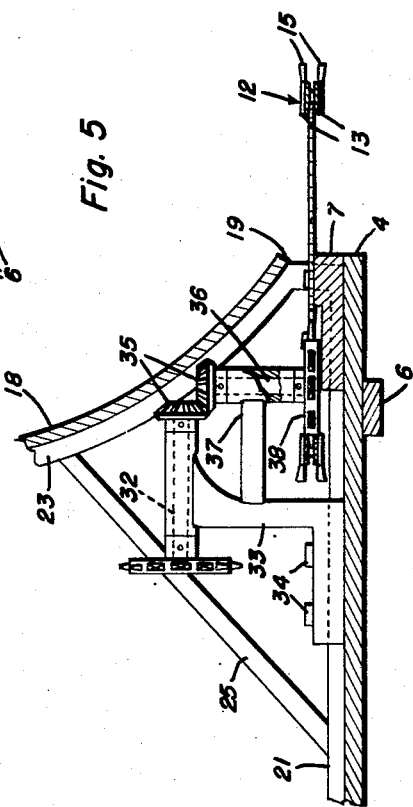
Inventor
John Patrick Horan June 28, 1955  J. P. HORAN  2,711,623
TRACTOR PROPELLED BRUSH CUTTER
Filed Feb. 12, 1951  3 Sheets-Sheet 3
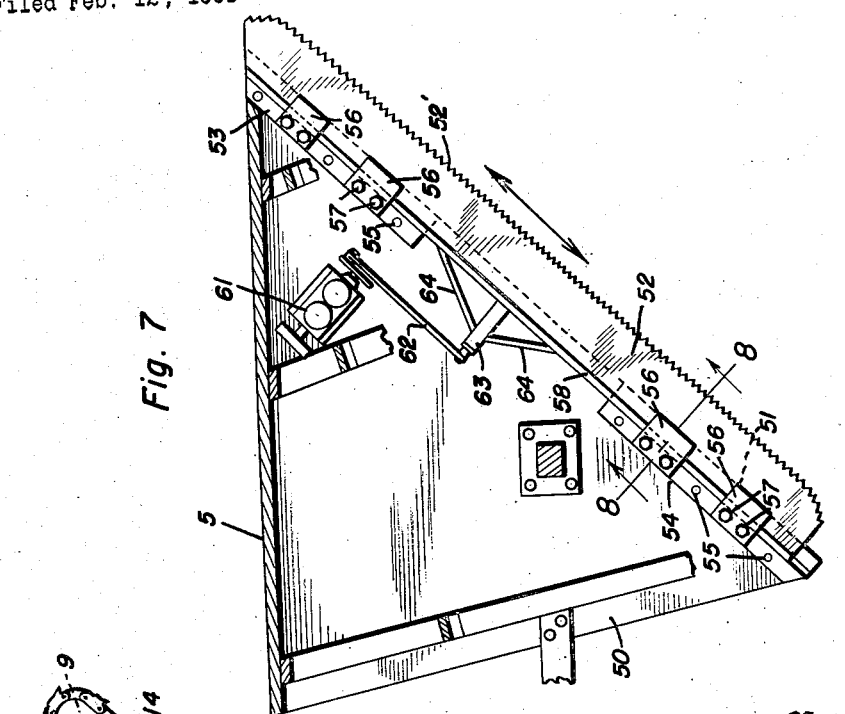
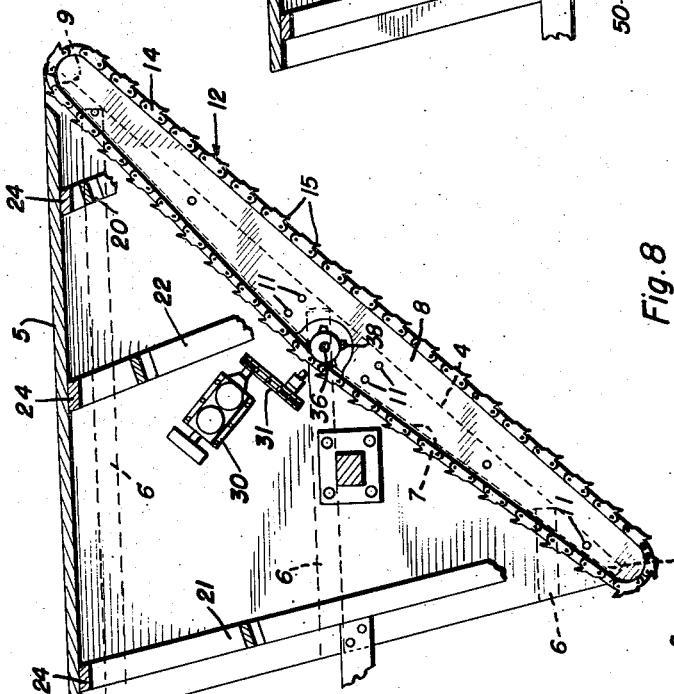
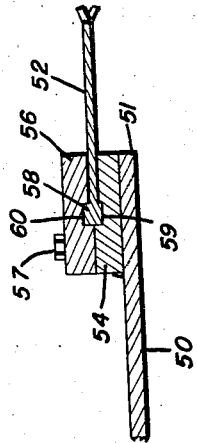
Inventor
John Patrick Horan
By Clarence A. O'Brien
and Harvey B. Jacobson
Attorneys

United States Patent Office 2,711,623
Patented June 28, 1955

2,711,623

TRACTOR PROPELLED BRUSH CUTTER

John Patrick Horan, Portage La Prairie, Manitoba, Canada

Application February 12, 1951, Serial No. 210,468

3 Claims. (Cl. 56—23)

My invention relates to improvements in tractor propelled brush cutters for clearing fields and the like.

The primary object of my invention is to provide a tractor propelled brush cutter for the purpose above specified which is constructed for heavy duty work in cutting thick heavy brush, saplings, and small trees close to the ground and for clearing a path as it cuts.

Another object is to provide a brush cutter for the above purposes adapted to cut obliquely of the path of travel thereof so as to facilitate its progress through brush and other growth.

Still another object is to provide a brush cutter which will not become clogged by the cut brush, saplings, or the like and which is comparatively inexpensive to manufacture and service.

Other and subordinate objects, within the purview of my invention, together with the precise nature of my improvements will be readily understood when the succeeding description and claims are read with reference to the drawings, accompanying and forming part of this specification.

In said drawings:

Figure 1 is a view in plan of my improved tractor propelled cutter in the preferred embodiment thereof;

Figure 2 is a view in side elevation;

Figure 3 is a view in horizontal section taken on the line 3—3 of Figure 2 and partly broken away;

Figure 4 is a view in vertical transverse section taken on the line 4—4 of Figure 1;

Figure 5 is an enlarged similar view taken on the line 5—5 of Figure 1, with parts broken away;

Figure 6 is an enlarged detail fragmentary view in vertical transverse section with parts eliminated to more clearly illustrate other details;

Figure 7 is a view in horizontal section, similar to Figure 3, and of a modified embodiment of my invention, and Figure 8 is a view in vertical transverse section taken on the line 8—8 of Figure 7 and drawn to a larger scale.

Referring to the drawings by numerals, and first to Figures 1 to 7, in the preferred embodiment thereof, my improved brush cutter, designated as a unit by the numeral 1, includes a triangular base, skid plate 2 of heavy steel coupled, as presently explained, to a tractor 3 to be pushed over the ground in front of the tractor 3, said skid plate 2 having a leading edge 4 oblique to the path of travel of said skid plate and an upstanding, substantially rectangular inboard side edge flange 5 substantially parallel to the path of travel of said skid plate. Longitudinal flat runner bars 6 are preferably suitably fixed to the bottom of said skid plate 2. A longitudinal spacer bar 7, for a purpose presently explained, extends along said leading edge 4 flush therewith and is secured to said skid plate 2 by means presently explained.

An elongated, horizontal cutter chain supporting plate 8 with rounded front and rear ends 9, 10 is imposed on said spacer bar 7 to extend longitudinally thereof, flatwise, and is bolted to said spacer bar 7 by bolts 11 also securing said bar 7 to the skid plate 2.

An endless link-type cutter chain 12 is trained around said supporting plate 8 with pairs of links 13 straddling the edge of said plate 8 so that said chain is adapted to slidably run horizontally along said edge of the cutter chain supporting plate 8 with a front working run 14 parallel with the leading edge 4 of the skid plate 2. The cutter chain supporting plate 8 is wider and longer than said spacer bar 7 and centered on said bar so as to project beyond both sides and the ends of said bar 7 whereby said cutter chain 12 runs clear of the spacer bar 7 with its front working run 14 offset outwardly beyond said bar 7 and the leading edge 4 of the skid plate 2. As best shown in Figures 2, 4 and 5, the cutter chain 12 runs close to the ground. The usual cutter teeth 15 for such chains are provided on the links 13.

A sweep plate 18 of steel, and similar to the mold board of a plow, rises above said cutter chain 12 with a bottom longitudinal edge 19 spaced close to said cutter chain supporting plate 8 parallel with the working run 14 of the cutter chain 12 and spaced inwardly therefrom. As will be understood, the sweep plate 18 is arranged obliquely of the path of travel of the skid plate 2 like said leading edge 4.

Front, rear, and intermediate brackets 20, 21, 22, respectively, of U-shape and bar steel are suitably fixed on the skid plate 2 as by welding, not shown, and are each provided with an upright curved side 23 fitting against the back of the sweep plate 18 and suitably fixed thereto to support said sweep plate, it being understood that the sweep plate 18 curves vertically like the mold board of a plow. Upright sides 24 of said brackets 20, 21, 22 are suitably fixed to the inboard side edge flange 5 to brace said flange. Diagonal braces 25, 26 on said brackets 20, 21, 22 strengthen the sides 23, 24 of each bracket.

A longitudinal fender bar 27 is suitably connected to and extends from the front edge of said side edge flange 5 rearwardly and obliquely above the sweep plate 18 substantially parallel with said plate and the front working run 14 of the cutter chain 12, said fender bar 27 having a rear end cross bar 28 connected thereto and to said side edge flange 5 to support said fender bar 27 at its rear end. An upstanding leg 29 on the rear bracket 21 supports the cross bar 28 in the approximate center thereof.

Means for driving the cutter chain 12 is provided comprising a suitable internal combustion engine 30 on the skid plate 2 operatively connected by a speed reducing sprocket and chain drive 31 to a horizontal driven shaft 32 journaled in a suitable bearing bracket 33 bolted, as at 34 to the skid plate 2, said shaft 32 extending transversely of said cuttter chain 12. The driven shaft 32 is connected by bevel gears 35 to the upper end of a vertical chain driving shaft 36 journaled in a bearing 37 on the bearing bracket 33. A sprocket wheel 38 suitably fixed on the lower end of said shaft 36 engages the rear, or inner, run of the cutter chain 12 to drive said cutter chain so that its front working run 46 travels rearwardly. Any suitable controls, not shown, may be provided for the engine 30.

The skid plate 2 is coupled to the tractor 3 as follows. A pair of substantially right angled pusher bars 40 are pivoted, as at 41, at rear ends thereof to opposite sides of the chassis frame 42 of the tractor 3 to extend forwardly of said tractor 3 in opposite relation and swing vertically on the pivots 41. An inverted U-shaped beam 43 rises from the skid plate 2 between the sweep plate 18 and the side edge flange 5 and is suitably fixed to said skid plate 2, as by bolts 44, with a rear side 45 extending rearwardly of said skid plate 2 and interposed between the front ends 46 of the pusher bars 40, said side 45 being pivoted to the front ends 46 of said pusher bars 40 by a cross shaft 47 connecting said ends 46 of said pusher bars. Pins 48 in the cross shaft 47 secure said shaft in place. As will be seen, the pusher bars 40 may swing vertically on the tractor 3 and the beams 46, together with the skid plate 2 and the parts thereon may swing vertically relative to the pusher bars 40 so that the skid plate 2 and parts thereon may ride up and down over uneven ground, or the like, as the skid plate 2 is pushed forwardly by the tractor 3.

The operation of the described preferred embodiment of my brush cutter will be readily understood. As the tractor 3 travels forwardly, the skid plate 2 is propelled forwardly on the runner bars 6 head of the tractor 3, over the ground and into brush, or undergrowth. With the engine 30 in operation, the cutter chain 12 is driven clockwise as indicated by the arrow in Figure 1 so that the front working run 14 of said chain travels rearwardly and obliquely in front of the skid plate 2 to cut down brush, and the like, and saplings encountered by said working run. The cut down brush, and other growth is swept aside, to the right side of the path of travel of the skid plate 2 and tractor 3 and out of the way of the tractor by the sweep plate 18, which, at its front end, acts as a plow point piloting the cutter chain into thick brush, or other growth. The progress of the brush cutter 1 may be controlled for cutting heavy brush, saplings, and even trees, by controlling the forward travel of the tractor 3 through the usual controls, not shown. The side edge flange 5, fender bar 27 and cross bar 28 prevents brush from falling into the space between the sweep plate 18 and said flange 5 and thus prevent such brush and the like from fouling the engine 30, and the sprocket and chain drive 31.

In the modified embodiment of the invention illustrated in Figures 7 and 8, the skid plate, designated 50, is provided above its leading oblique edge 51 with a reciprocating saw blade 52 extending along said edge with its cutting edge 52' offset outwardly of said edge 51. The saw blade 52 is slidably mounted on a pair of longitudinal front and rear supporting bars 53, 54 bolted on the skid plate 50, as at 55, and extending along said leading edge 51 in end to end spaced apart relation. Saw keeper plates 56 are bolted, as at 57, on said supporting bars 53, 54 to cooperate with said bars 53, 54 in guiding the saw blade 52 to reciprocate in a horizontal plane. A back edge guide rib 58 on said saw blade 52 slidably fits in grooves 59, 60 in said bars 53, 54 and said keeper plates, as shown in Figure 8, said rib 58 and grooves 59, 60 guiding the saw blade 52 in a straight path during reciprocation of said blade.

The saw blade 52 is reciprocated by an internal combustion engine 61 suitably fixed on the skid plate 50, and a pitman drive 62 between said engine and a lateral post 63 extending rearwardly, horizontally from the guide rib 58 in the transverse center of the saw blade 52. Diagonal braces 64 extend from the edge guide 58 to said post 63 for reinforcing purposes.

Otherwise than as described in the two immediately preceding paragraphs, the modified embodiment of my invention is the same as the preferred embodiment except that the cutting operation is accomplished by intermittent sawing instead of by a continuous cutting operation.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. A brush cutter for propelling forwardly in a straight path by a tractor in front thereof comprising a triangular skid plate for riding over the ground and having a leading side edge oblique to the path of travel of the plate and an opposite side edge parallel to said path, a driven cutter member, means mounting said cutter member on said plate to extend along said oblique side edge and move parallel therewith and with respect thereto, power means on said skid plate drivingly connected to said member, an upstanding sweep plate mounted on said skid plate over said cutter member parallel with said cutter member and curving laterally outwardly over the same to deflect cut brush away from said member, a longitudinal upstanding flange on said other side edge of the skid plate parallel therewith, a horizontal fender bar at the oblique side edge of the skid plate parallel with and above said sweep plate and carried by said flange and together with said flange and sweep plate preventing brush from falling onto said skid plate and fouling said power means, and pusher means coupling said skid plate to the tractor.

2. A brush cutter according to claim 1, said first named means comprising longitudinally spaced guide bars supporting said member on said oblique side edge, said power means including a pitman working between said bars.

3. A brush cutter according to claim 1, said cutter member comprising a horizontal saw blade extending parallel with and above said oblique side edge outwardly over the same.

References Cited in the file of this patent
UNITED STATES PATENTS

| | | |
|---|---|---|
| 889,970 | Rustad | June 9, 1908 |
| 1,001,211 | Mitchell | Aug. 22, 1911 |
| 1,200,099 | Goddard et al. | Oct. 3, 1916 |
| 1,346,197 | Gross | July 13, 1920 |
| 1,351,014 | Whitaker | Aug. 24, 1920 |
| 1,356,619 | Gross | Oct. 26, 1920 |
| 2,216,313 | Fulton | Oct. 1, 1940 |
| 2,543,386 | Templeton | Feb. 27, 1951 |